Feb. 26, 1935.   A. A. JOHNSON   1,992,575
PHONOGRAPH
Original Filed Oct. 5, 1928   2 Sheets-Sheet 1
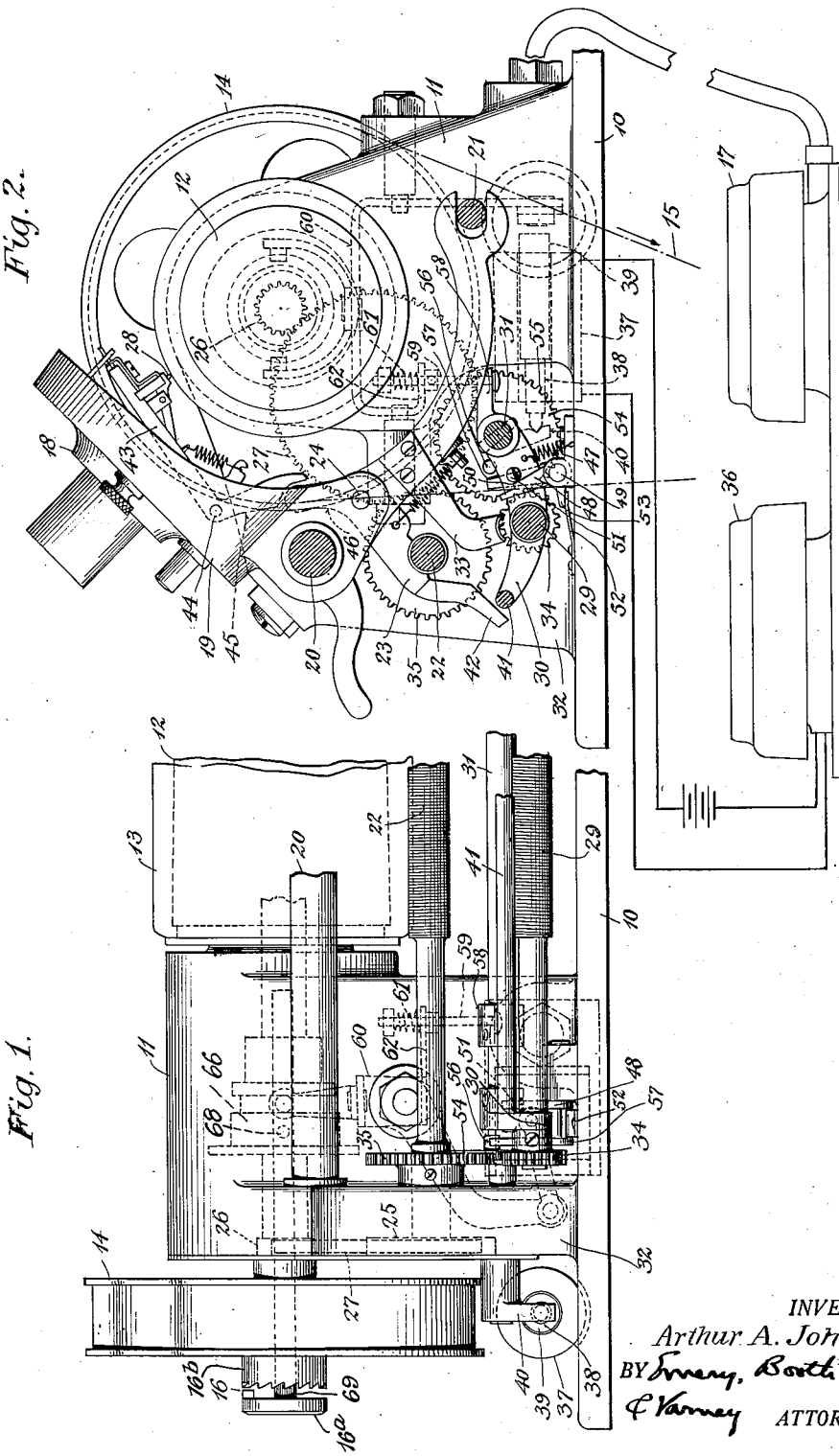
INVENTOR.
Arthur A. Johnson,
BY Emery, Booth, Janney
& Varney   ATTORNEYS.

Feb. 26, 1935.  A. A. JOHNSON  1,992,575
PHONOGRAPH
Original Filed Oct. 5, 1928  2 Sheets-Sheet 2
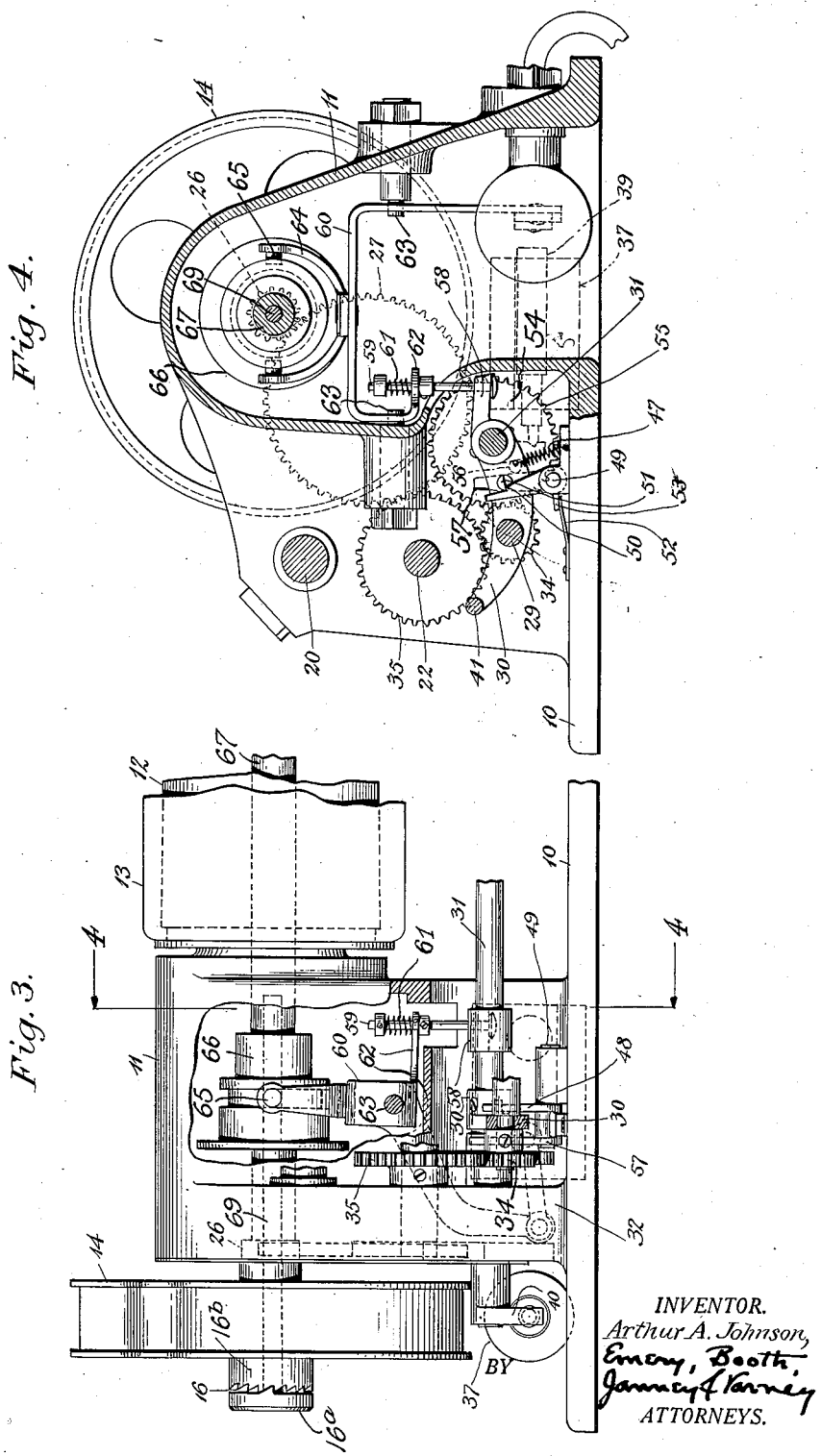
INVENTOR.
Arthur A. Johnson,
BY
ATTORNEYS.

Patented Feb. 26, 1935

1,992,575

UNITED STATES PATENT OFFICE 1,992,575

PHONOGRAPH

Arthur A. Johnson, Bridgeport, Conn., assignor to Dictaphone Corporation, Bridgeport, Conn., a corporation of New York Application October 5, 1928, Serial No. 310,451
Renewed July 30, 1932

19 Claims. (Cl. 274—21)

This invention relates to phonographs, and more particularly to commercial phonographs of the transcribing machine type.

In the latter, it is frequently desired to move the sound-box carriage backwardly over the record to cause the portion of the record just reproduced to be repeated, so that the operator may verify the transcription or pick up the last few words when resuming work after a pause.

For these purposes, it has been proposed heretofore to provide back-spacing mechanism comprising a reverse feed screw and carriage nut adapted to cooperate so long as an operator's control device was held in operative position by the operator.

An object of this invention is to provide means whereby the reverse feed screw and carriage nut will remain operative for a predetermined time after the depression and immediate release of the operator's control device, so that the carriage will be returned a predetermined distance upon each operation of the operator's control device, without requiring the operator to maintain the latter in operative position. This is accomplished in the embodiment of the invention illustrated and described herein as exemplary thereof, by automatically holding the reverse feed screw and carriage nut operative when made so by the operator's control device, and automatically rendering the reverse feed screw and carriage nut inoperative when the former has rotated a predetermined amount.

Another object of this invention is to provide means whereby the carriage may continue to move in returning direction beyond the predetermined distance above referred to, when the operator so desires, notwithstanding the presence in the machine of the means for causing the predetermined return movement of the carriage. This is accomplished in the form shown by causing the operator's control device to keep the reverse feed screw operative, independently of the automatic means for rendering it inoperative after a predetermined time, so long as the operator's control device is maintained in operative position by the operator.

Heretofore, it has been customary for the operator to stop the machine preparatory to the back-spacing operation, and then to again start the machine after the completion of the back-spacing movement of the carriage, or, upon resuming work after a pause, to back-space the carriage and then start the machine so that the matter recorded would be repeated.

According to the present invention, however, this mode of operation is substantially simplified, for means are provided whereby the machine resumes reproduction automatically as soon as the back-spacing operation is completed. Thus, according to the present invention, the operator needs to perform no operation in order to listen to the matter recorded after the carriage has been back-spaced. Should the machine be in stopped condition when the back-space device is operated, the means provided by the present invention will automatically start the machine with the result that the carriage will back-space and immediately begin to reproduce at the end of the back-spacing operation.

Other features and advantages will hereinafter appear.

In the accompanying drawings—

Figure 1 is a front elevation of a part of a transcribing machine, showing the present invention applied thereto.

Fig. 2 is a side elevation of a transcribing machine, showing the parts in their normal reproducing positions.

Fig. 3 is a view similar to Fig. 1, but showing part of the frame broken away to illustrate the clutch-shifting mechanism and the means for automatically operating the same from the back-spacing device.

Fig. 4 is a transverse sectional view taken on the line 4—4 of Fig. 3.

In the commercial phonograph or transcribing machine illustrated herein, the base 10 is provided at one side with a housing 11 which forms a support for a rotatable mandrel 12 adapted to carry a record 13 to be reproduced. The mandrel is driven by a pulley 14 having a belt 15 leading to a driving motor not shown, and when it is desired to start the machine, a clutch 16 between the mandrel and the pulley is moved to operative position under the control of an operator's start-and-stop device 17.

The record is reproduced by a sound-box 18 mounted in a carriage 19 adapted to slide on rods 20 and 21 to and fro along the base 10. The sound-box carriage 19 is caused to travel in reproducing direction by a feed screw 22 which is engaged by a feed nut 23 carried by the carriage and pivotally mounted at 24 thereon. The feed screw 22 has secured thereto a gear 25 driven by a pinion 26 on the mandrel shaft through an idle gear 27, so that a reproducing stylus 28 carried by the sound-box will move longitudinally of the machine and follow the helical groove in the surface of the record 13.

In order to automatically back-space the carriage a predetermined amount, the present invention provides a reverse feed screw 29 mounted between arms 30 which in turn are secured to a shaft 31 mounted in standards 32 carried by the base 10 for pivotal movement, so that the reverse feed screw 29 may be moved into engagement with a reverse feed nut 33 mounted on the carriage 19, when it is desired to back-space the carriage so as to listen to the matter just reproduced. The screw threads on the feed screw 22 and the reverse feed screw 29 may be either right hand or left hand lead, as desired. In the form of the invention shown, those on the reverse feed screw have the same pitch direction as those on the feed screw 22, but the reverse feed screw 29 rotates in a direction opposite to that of the feed screw 22, and hence the carriage 19 moves backwardly when the reverse feed screw 29 and the reverse feed nut 33 are engaged. For this purpose, the reverse feed screw 29 is provided with a gear 34 and the feed screw 22 is provided with a gear 35, and these are adapted to engage so that when the gear 35 on the reverse feed screw 22 rotates clockwise, the gear 34 on the reverse feed screw 29 rotates anti-clockwise.

Since the backward movement of the carriage may be faster than the forward movement and is preferably rapid, the pitch of the threads on the reverse feed screw 29 may be substantially greater than that of the forward feed screw 22. However, in order to permit the feed screws 22 and 29 to be alike and yet have the return movement of the carriage quicker than the advancing movement, the gear 34 on the reverse feed screw 29 is preferably substantially smaller than the gear 35 which drives it. Hence, the reverse feed screw 29 rotates more rapidly than the feed screw 22 and the carriage return is faster than its travel forward.

When it is desired to back-space the carriage, the operator's back-space control 36 is depressed to close an electric circuit leading to a solenoid 37 mounted on the base 10 just to the left of the standard 32. When this solenoid is energized, a push rod 38 on its armature 39 engages and moves an arm 40 secured to the shaft 31. This causes the shaft 31 to be rocked clockwise with the result that the reverse feed screw 29 is moved into engagement with the nut 33 on the carriage. At the same time, the gear 34 on the reverse feed screw is moved into engagement with its driving gear 35 and this causes the reverse feed screw to rotate and move the carriage backwardly.

The rocking movement of the shaft 31 by the solenoid armature 39 also causes the feed nut 23, which engages the feed screw 22 during forward movement of the carriage, to be moved out of engagement with its feed screw before the reverse feed screw 34 comes into contact with reverse feed nut 33, so that the carriage will not be prevented from moving backwardly by the screw 22 and nut 23. This is accomplished by a rod 41 secured to the arms 30 on the shaft 31 and adapted to engage a cam arm 42 secured to the nut 23. The rod 41 forms a bail with the arms 30 and extends longitudinally of the machine so that no matter what position the carriage occupies along its path of travel, the upward movement of the arms 30 to bring the reverse feed screw 29 into engagement with the reverse feed nut 33 will cause the rod 41 to engage the cam 42 and lift the feed nut 23 from the feed screw 22 before the reverse feed screw and nut engage.

The stylus 28, which is mounted on a stylus carrier 43 pivoted at 44 on the sound-box 18 and having an arm 45, may be raised from its record-engaging position shown in Fig. 2 during the back-spacing operation by an arm 46 connected to and operated with the feed nut 23.

With the mechanism above described, when the parts are moved to their positions shown in Fig. 4, as the result of the operation of the solenoid 37, the back-spacing movement of the carriage will continue so long as the operator maintains the back-space control 36 depressed, and consequently the carriage will move backwardly an indeterminate amount. It is desirable that this be so, for occasionally the operator desires to return the carriage a relatively large amount to verify a paragraph or possibly an entire letter. Usually, however, the operator merely needs to return the carriage a relatively small amount and, therefore, the present invention provides means whereby the operation of the back-space control 36, followed by its immediate release, will cause the back-spacing operation to continue for a predetermined time only.

In the embodiment of the invention herein illustrated, this is accomplished by providing a latch for holding the reverse feed screw 29 in engagement with the reverse feet nut 33, and means controlled by the rotation of the reverse feed screw 29 for automatically rendering the latch inoperative after the reverse feed screw has rotated a predetermined amount, so that the reverse feed screw 29 may return to its inoperative position shown in Fig. 2, under the influence of a spring 47.

The latch referred to comprises an arm 48 which is secured to a spindle 49 journaled in a bearing secured to the base 10, and which has a shoulder 50 adapted to engage a lug 51 carried by one of the arms 30 of the reverse feed screw carrying bail. Thus, when the reverse feed screw 29 moves from the position shown in Fig. 2 to the position shown in Fig. 4, a spring 52 engaging an arm 53 secured to the latch arm 48 moves the shoulder 50 under the lug 51 and thus latches or holds the bail in raised or operative position. To automatically release this latch, that is to say, move the arm 48 so as to remove the shoulder 50 from under the lug 51 after a predetermined amount of rotation of the reverse feed screw 29 has occurred, a disk 54 freely rotatably mounted on the shaft 31 is provided with gear teeth 55 permanently meshing with the gear 34 secured to the reverse feed screw 29, so as to be rotated thereby. On this disk 54 there is provided a cam pin 56 adapted to strike and move an arm 57 secured to the shaft 49 of the latch arm 48 for pivotal movement with the latter. Normally, the disk 54 is stationary because it is in permanent mesh with the gear 34 on the reverse feed screw which, in turn, is normally out of engagement with the driving gear 35 on the feed screw 22. When, however, the reverse feed screw is moved into engagement with the reverse feed nut, the disk 54 commences to rotate.

After a predetermined amount of rotation of the reverse feed screw, the cam pin 56 is carried around to a position shown in dotted lines in Fig. 4, where it engages the arm 57. The continued movement of the pin causes it to move the arm 57 from the position shown in Figure 4 to substantially that shown in Fig. 2. This movement of the latch causes the shoulder 50 to be withdrawn from under the lug 51 so that the spring 47 may return the bail carrying the reverse feed screw 29 to inoperative position. As soon as this occurs, the cam disk 54 stops and remains in position to again begin rotating and measure the extent of rotation of the reverse feed screw when the latter is again moved to operative position.

By having the reverse feed screw operated by the forward feed screw which only operates when the machine is in started position, that is, when the clutch 16 is operative, the machine will commence to reproduce as soon as the back-spacing operation is finished, for the return of the advance feed nut 23 to its engagement with the feed screw 22 will cause the stylus 28 to again engage the record surface and the carriage to move in advancing direction. Thus, according to the present invention, when the operator, while listening to the reproduction of the record, desires to have the portion just heard repeated, he merely depressed the back-space control 36 without first releasing the operator's stop-and-start device 17, as has heretofore been the custom.

Hence, upon operation of the back-space control 36, reproduction ceases because the stylus 28 is raised from the record and the feed nut 23 is disengaged from the feed screw; then the carriage back-spaces; and finally the stylus returns to the record, the feed nut reengages the feed screw, and the reproduction begins without the operator performing any other operation than that of depressing the back space control.

Occasionally, as, for instance, when resuming work after a pause, the operator has not as yet started the machine by the operation of the stop-and-start device 17. To avoid the necessity of the operator starting the machine by the operation of the start-and-stop device 17 under such conditions, the present invention provides means for automatically starting the machine, i. e. throwing-in the clutch 16 if the machine is not started when the back-space control 36 is operated. For this purpose, the shaft 31, which is rocked by the back-space solenoid 37, is provided with an arm 58 having a link 59 connecting it with a clutch-shifter 60 of the clutch mechanism which is located within the housing 11. This shifter 60 is pivotally mounted as at 63 (see Fig. 4) and carries a yoke member 64, provided with pins 65 adapted to coact with grooved collar 66 to shift said collar longitudinally of the mandrel shaft 67. A pin 68 (see Fig. 1) passes through both the collar 66 and a rod 69 slidable longitudinally within shaft 67, the latter being slotted in a well known manner to permit relative movement of the pin 68 with respect to the shaft 67. The clutch 16 comprises a member 16a secured to the rod 69 and a member 16b forming a part of the hub of the pulley 14. As shown in Fig. 1, the clutch parts are disengaged and the machine is inoperative. When, however, the clutch shifter 60 is rocked either by the solenoid 37, or, in a well known manner, through a Bowden wire connection with the starting and stopping control 17, then, immediately, the collar 66 is drawn to the right along the shaft 67, as viewed in Fig. 3, moving with it the rod 69 and causing engagement of clutch member 16a with clutch member 16b. The rotation of pulley 14 now may transmit motion to the mandrel shaft 67 and through the gearing 25, 26 and 27 to the feed screw 22 and gear 35.

The link 59 has a flexible connection comprising a spring 61 to an arm 62 of the clutch-shifter 60, and this connection permits swivelling movement of the link in the arm, which is necessary because the axis of movement of the shifter is at right angles to the axis of movement of the bail. The end of the link loosely passes through the arm 58 secured to the shaft 31 and has a head underlying the arm. Hence, when the arm 58 is rocked, the link 59 is pulled down and the shifter is moved to cause the clutch 16 to engage, with the result that the machine is started. The clutch-shifter may, however, be operated to start-and-stop the machine without causing the link 59 to rock the arm 58, because in the said circumstances the link 59 merely slides through the arm. Hence, it will be seen that depression of the back-space key 36 not only causes the matter last reproduced to be again reproduced, but causes the machine to continue to reproduce after the repetition.

Variations and modifications may be made within the scope of this invention and portions of the improvements may be used without others.

Having thus described the invention, what is claimed as new and for which it is desired to obtain Letters Patent, is:—

1. In a transcribing machine having a sound-box carriage and means for moving the carriage in advancing direction; means for moving the carriage in returning direction a predetermined extent comprising a reverse feed screw; means for making the latter operative; and means for automatically rendering the reverse feed screw inoperative after the carriage has received a predetermined backward movement.

2. In a transcribing machine having a sound-box carriage, start-and-stop mechanism, and means for moving the carriage in advancing direction when the start-and-stop mechanism is operated to start the machine: means movable to an operative position for moving the carriage in returning direction; and means responsive to movement of the last-named means to said operative position for automatically operating the start-and-stop mechanism to start the machine.

3. In a transcribing machine having a sound-box, a carriage therefor, start-and-stop mechanism, and means for moving the carriage in advancing direction when the start-and-stop mechanism is operated to start the machine: manually-controlled power-operated means movable to an operative position for moving the carriage in returning direction; means responsive to movement of said power-operated means to said operative position for automatically operating the start-and-stop mechanism to start the machine, and conditioning means for said sound-box adapted to render same operative to reproduce whenever said carriage-advancing means is effective and to render it inoperative whenever said carriage-returning means is effective.

4. In a transcribing machine having a sound-box carriage, start-and-stop mechanism, and means for moving the carriage in advancing direction when the start-and-stop mechanism is operated to start the machine: means operable while the machine is in started position for moving the carriage in returning direction; manually-controlled power-operated means for making the last-named means effective; and means operated by said power-operated means to insure that the start-and-stop mechanism is in started condition.

5. In a transcribing machine, a sound-box carriage; an advance feed screw for moving the carriage forwardly; a reverse feed screw for moving the carriage backwardly; an advance feed nut pivotally mounted on the carriage for movement into and out of engagement with the advance feed screw; a reverse feed nut on the carriage; means for mounting the reverse feed screw on the machine for movement into and out of engagement with the reverse feed nut; and means carried by the last-named means for moving the advance feed nut out of engagement with the advance feed screw before the reverse feed screw is engaged by the reverse feed nut.

6. In a transcribing machine, a sound-box carriage; an advance feed screw for moving the carriage forwardly; a reverse feed screw for moving the carriage backwardly; an advance feed nut pivotally mounted on the carriage for movement into and out of engagement with the advance feed screw; a reverse feed nut on the carriage; means for mounting the reverse feed screw on the machine for movement into and out of engagement with the reverse feed nut; means carried by the last-named means for moving the advance feed nut out of engagement with the advance feed screw before the reverse feed screw is engaged by the reverse feed nut; and means for holding the reverse feed screw in operative engagement with the reverse feed nut and the advance feed nut out of engagement with the advance feed screw for a predetermined time.

7. In a transcribing machine, a sound-box carriage; an advance feed screw for moving the carriage forwardly; a reverse feed screw for moving the carriage backwardly; an advance feed nut pivotally mounted on the carriage for movement into and out of engagement with the advance feed screw; a reverse feed nut on the carriage; means for mounting the reverse feed screw on the machine for movement into and out of engagement with the reverse feed nut; means carried by the last-named means for moving the advance feed nut out of engagement with the advance feed screw before the reverse feed screw is engaged by the reverse feed nut; means for holding the reverse feed screw in operative engagement with the reverse feed nut and the advance feed nut out of engagement with the advancing feed screw for a predetermined time; and means for making said holding means inoperative.

8. In a transcribing machine, a sound-box carriage; an advance feed screw for moving the carriage forwardly; a reverse feed screw for moving the carriage backwardly; an advance feed nut mounted on the carriage for movement into and out of engagement with the advance feed screw; a reverse feed nut on the carriage; a bail for supporting the reverse feed screw on the machine for movement into and out of engagement with the reverse feed nut; means carried by the bail for moving the advance feed nut out of engagement with the advance feed screw before the reverse feed screw is engaged by the reverse feed nut; and a latch for holding the reverse feed screw in engagement with the reverse feed nut.

9. In a transcribing machine, a sound-box carriage; an advance feed screw for moving the carriage forwardly; a reverse feed screw for moving the carriage backwardly; an advance feed nut mounted on the carriage for movement into and out of engagement with the advance feed screw; a reverse feed nut on the carriage; a bail for supporting the reverse feed screw on the machine for movement into and out of engagement with the reverse feed nut; means carried by the bail for moving the advance feed nut out of engagement with the advance feed screw before the reverse feed screw is engaged by the reverse feed nut; a latch for holding the reverse feed screw in engagement with the reverse feed nut; and means for rotating the reverse feed screw with the advance feed screw, said means being normally held in an inoperative position, and mounted to be moved into operative position upon movement of the bail to carry the reverse feed screw into engagement with the reverse feed nut.

10. In a transcribing machine, a sound-box carriage; an advance feed screw for moving the carriage forwardly; a reverse feed screw for moving the carriage backwardly; an advance feed nut mounted on the carriage for movement into and out of engagement with the advance feed screw; a reverse feed nut on the carriage; a bail for supporting the reverse feed screw on the machine for movement into and out of engagement with the reverse feed nut; means carried by the bail for moving the advance feed nut out of engagement with the advance feed screw before the reverse feed screw is engaged by the reverse feed nut; a latch for holding the reverse feed screw in engagement with the reverse feed nut; means for rotating the reverse feed screw with the advance feed screw, said means being normally held in an inoperative position, and mounted to be moved into operative position upon movement of the bail to carry the reverse feed screw into engagement with the reverse feed nut; and a cam operated by the reverse feed screw and adapted upon a predetermined rotation thereof to cause the latch to become disengaged from the bail and permit the reverse feed screw to return to normal inoperative position out of engagement with the reverse feed nut.

11. In a transcribing machine, a sound-box carriage; an advance feed-screw for moving the carriage forwardly; a reverse feed screw for moving the carriage backwardly; and shiftable supporting means for said reverse feed-screw operable to cause the reverse feed screw to be moved between operative and inoperative positions.

12. In a transcribing machine, a sound-box carriage; an advance feed screw for moving the carriage forwardly; a reverse feed screw for moving the carriage backwardly; a shiftable supporting means for said reverse feed-screw operable to cause the reverse feed screw to be moved between operative and inoperative positions; and a solenoid for shifting said supporting means.

13. In a transcribing machine, a sound-box carriage; an advance feed-screw for moving the carriage forwardly; a reverse feed screw for moving the carriage backwardly; a shiftable supporting means for said reverse feed-screw operable to cause the reverse feed screw to be moved between operative and inoperative positions; a solenoid for shifting the said supporting means; and an electric switch in circuit with the solenoid and operable from a point remote from the machine to control the operation of the solenoid.

14. In a transcribing machine, a sound-box carriage; an advance feed screw for moving the carriage forwardly; driving means for said advance feed-screw; a reverse feed screw for moving the carriage backwardly; a driving member on the advance feed screw; a driven member on the reverse feed screw, means for normally holding said members out of operative relation with each other so that the reverse feed screw is normally idle; and means for bringing said members into operative relation to cause the advance feed-screw to drive the reverse feed-screw.

15. In a transcribing machine, a sound-box carriage; an advance feed screw for moving the carriage forwardly; a reverse feed screw for moving the carriage backwardly; a driving member on the advance feed screw; a driven member on the reverse feed screw, said members being normally out of driving relation with each other so that the reverse feed screw is normally idle; means for bringing said members into driving relation to cause the reverse feed screw to rotate with the rotation of the advance feed screw; and means for predetermining the amount of rotation of the reverse feed screw comprising a timing gear in constant mesh with and driven by the driven member on the reverse feed screw so as to rotate coordinately with the reverse feed screw.

16. In a transcribing machine having a sound-box carriage, start-and-stop mechanism, and means for moving the carriage in advancing direction when the start-and-stop mechanism is operated to start the machine: means operable while the machine is in started position for moving the carriage in returning direction, manually-controlled power-operated means for making the last named means effective, and means operated by said power-operated means adapted to actuate said start-and-stop mechanism to start the machine when said power-operated means is actuated with the start-and-stop mechanism in stopped position.

17. In a transcribing machine, a sound-box carriage, an advance feed screw for moving the carriage forwardly, a reverse feed screw for moving the carriage backwardly, a rotatable record support, means for controlling the rotation of said record-support, power means for driving the advance feed screw at all times that the record support rotates, means for intermittently driving the reverse feed screw from said power means including a rockable arm, and means associated with said rockable arm for actuating the said controlling means for said record support.

18. In a transcribing machine having a sound-box carriage and means for moving the carriage in advancing direction; means for effecting the moving of the carriage in a return direction a predetermined extent comprising a reverse feed screw; and means for automatically rendering the reverse feed screw ineffective after the carriage has received a predetermined backward movement.

19. In a transcribing machine having a sound-box carriage, start-and-stop mechanism, and means for moving the carriage in advancing direction when the start-and-stop mechanism is operated to start the machine, means operable while the machine is in started position for moving the carriage in returning direction; manually controlled means for making the last-named means effective; and means operated by said manually controlled means to insure the return of the start-and-stop mechanism to starting position.

ARTHUR A. JOHNSON.